United States Patent
Mason et al.

(10) Patent No.: US 12,479,234 B2
(45) Date of Patent: Nov. 25, 2025

(54) VEHICLE WHEELS AND METHODS OF MAKING VEHICLE WHEELS

(71) Applicant: Howmet Aerospace Inc., Pittsburgh, PA (US)

(72) Inventors: Douglas P. Mason, Livonia, MI (US); Gabriele F. Ciccola, Hudson, OH (US); Spencer Wallace, Broadview Heights, OH (US); Kellen M. Finn, Broadview Heights, OH (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 574 days.

(21) Appl. No.: 17/758,117

(22) PCT Filed: Sep. 21, 2020

(86) PCT No.: PCT/US2020/051829
§ 371 (c)(1),
(2) Date: Jun. 28, 2022

(87) PCT Pub. No.: WO2021/154340
PCT Pub. Date: Aug. 5, 2021

(65) Prior Publication Data
US 2023/0049870 A1 Feb. 16, 2023

Related U.S. Application Data

(60) Provisional application No. 62/967,675, filed on Jan. 30, 2020.

(51) Int. Cl.
*B60B 21/02* (2006.01)
*B60B 7/02* (2006.01)
(Continued)

(52) U.S. Cl.
CPC ............ *B60B 21/02* (2013.01); *B60B 7/02* (2013.01); *B60B 7/063* (2013.01); *B60B 21/106* (2013.01)

(58) Field of Classification Search
CPC .. B60B 7/02; B60B 7/08; B60B 7/063; B60B 7/105; B60B 21/02; B60B 21/04;
(Continued)

(56) References Cited

U.S. PATENT DOCUMENTS

| 2,729,509 | A | * | 1/1956 | Lyon | ........................ B60B 7/08 |
| | | | | | 301/37.39 |
| 4,235,271 | A | * | 11/1980 | Olsen | ........................ B60B 7/01 |
| | | | | | 152/154 |

(Continued)

FOREIGN PATENT DOCUMENTS

| CN | 105848920 A | 8/2016 | |
| CN | 108712971 A | * 10/2018 | ............... B60B 5/02 |

(Continued)

OTHER PUBLICATIONS

International Search Report and Written Opinion of the International Searching Authority for International Application No. PCT/US2020/051829 mailed Dec. 30, 2020.

*Primary Examiner* — S. Joseph Morano
*Assistant Examiner* — Eva L Comino
(74) *Attorney, Agent, or Firm* — K&L Gates LLP

(57) ABSTRACT

Vehicle wheels and methods of making vehicle wheels are provided. A vehicle wheel comprises a generally annular first region, a second region, and a flange extension. The first region comprises an inner surface and an outer surface comprising a tire bead seat. The second region extends radially inwardly from the first region. The second region is configured to mount to a vehicle axle. The flange extension extends from the first region in a direction away from the second region. The flange extension comprises a first exten- (Continued)

sion end integral with the first region, a second extension end, and an elongate portion intermediate the first extension end and the second extension end. The elongate portion comprising a first portion with a thickness less than a thickness of the second extension end.

19 Claims, 9 Drawing Sheets

(51) Int. Cl.
*B60B 7/06* (2006.01)
*B60B 21/10* (2006.01)
(58) Field of Classification Search
CPC ......... B60B 21/06; B60B 21/106; B60B 3/02; B60B 2310/305; B60N 2900/311; B60N 2900/711; B60Y 2200/10
USPC .................................................... 301/95.101
See application file for complete search history.

(56) References Cited

U.S. PATENT DOCUMENTS

| | | | | |
|---|---|---|---|---|
| 5,340,418 A | * | 8/1994 | Wei | B60B 3/06 148/698 |
| 5,435,631 A | | 7/1995 | Maloney et al. | |
| 5,435,632 A | * | 7/1995 | Gajor | B60B 25/004 301/63.105 |
| 5,533,261 A | * | 7/1996 | Kemmerer | B21D 53/26 29/894.354 |
| 5,884,981 A | * | 3/1999 | Ichikawa | B60B 7/02 301/37.36 |
| 6,491,351 B1 | * | 12/2002 | Mikami | B60B 3/005 301/63.101 |
| 6,536,111 B1 | * | 3/2003 | Baumgarten | B60B 21/026 29/894.35 |
| 7,347,505 B2 | * | 3/2008 | Rodrigues | B60B 3/02 301/63.103 |
| 7,621,048 B2 | | 11/2009 | Coleman et al. | |
| 7,631,946 B2 | * | 12/2009 | Francischetti | B60B 25/004 301/63.106 |
| 2002/0153763 A1 | * | 10/2002 | Van Houten | B60B 7/01 301/37.43 |
| 2003/0137187 A1 | * | 7/2003 | Williams | B60B 7/02 301/37.103 |
| 2003/0155805 A1 | | 8/2003 | Tanaka | |
| 2007/0062040 A1 | * | 3/2007 | Coleman | B60B 25/004 301/37.43 |
| 2010/0066155 A1 | * | 3/2010 | Seradarian | B60B 7/01 301/37.102 |
| 2011/0148181 A1 | * | 6/2011 | Silva de Carvalho | B60B 7/0046 301/37.42 |
| 2013/0270892 A1 | * | 10/2013 | Nakayama | B60B 21/104 301/95.101 |

FOREIGN PATENT DOCUMENTS

| | | | | |
|---|---|---|---|---|
| CN | 1102227770 A | * | 9/2019 | ............ B21D 53/26 |
| CN | 110341374 A | | 10/2019 | |
| FR | 447045 A | * | 12/1912 | ............... B60B 7/00 |
| JP | 2001502993 A | * | 3/2001 | ............... B60B 7/04 |
| JP | 2002234303 A | * | 8/2002 | ............... B60B 21/02 |
| JP | 3760872 B2 | * | 3/2006 | ............... B60B 21/04 |
| JP | 2008137562 A | * | 6/2008 | ............... B60B 21/02 |
| JP | 2010195289 A | * | 9/2010 | ............... B60B 21/02 |
| KR | 10-2010-0032588 A | | 3/2010 | |

\* cited by examiner

VEHICLE WHEELS AND METHODS OF MAKING VEHICLE WHEELS

PRIORITY

The present application claims priority to U.S. Provisional Patent Application Ser. No. 62/967,675, filed Jan. 30, 2020, which is incorporated herein by reference in its entirety.

FIELD OF USE

The present disclosure relates to vehicle wheels and methods of making vehicle wheels.

BACKGROUND

The weight of a vehicle wheel can be reduced by reducing wheel thickness. Additionally, external components may need to be attached to a vehicle wheel. There are challenges associated with reducing the thickness of a vehicle wheel and attaching external components to a vehicle wheel.

SUMMARY

According to one aspect of the present disclosure, a vehicle wheel is provided. The vehicle wheel comprises a generally annular first region, a second region, and a flange extension. The first region comprises an inner surface and an outer surface comprising a tire bead seat. The second region extends radially inwardly from the first region. The second region is configured to mount to a vehicle axle. The flange extension extends from the first region in a direction away from the second region. The flange extension comprises a first extension end integral with the first region, a second extension end, and an elongate portion intermediate the first extension end and the second extension end. The elongate portion comprising a first portion with a thickness less than a thickness of the second extension end.

According to another aspect of the present disclosure, a method of producing a vehicle wheel is provided. The method comprises providing a vehicle wheel by a method comprising at least one of forming, curing, forging, casting, and additive manufacturing. The vehicle wheel comprises one or more of a metal, a metal alloy, and a composite. The vehicle wheel comprises a generally annular first region, a second region, and a flange extension. The first region comprises an inner surface and an outer surface comprising a tire bead seat. The second region extends radially inwardly from the first region. The second region is configured to mount to a vehicle axle. The flange extension extends from the first region in a direction away from the second region. The flange extension comprises a first extension end integral with the first region, a second extension end, and an elongate portion intermediate the first extension end and the second extension end. The elongate portion comprising a first portion with a thickness less than a thickness of the second extension end.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION

Figure 1A:
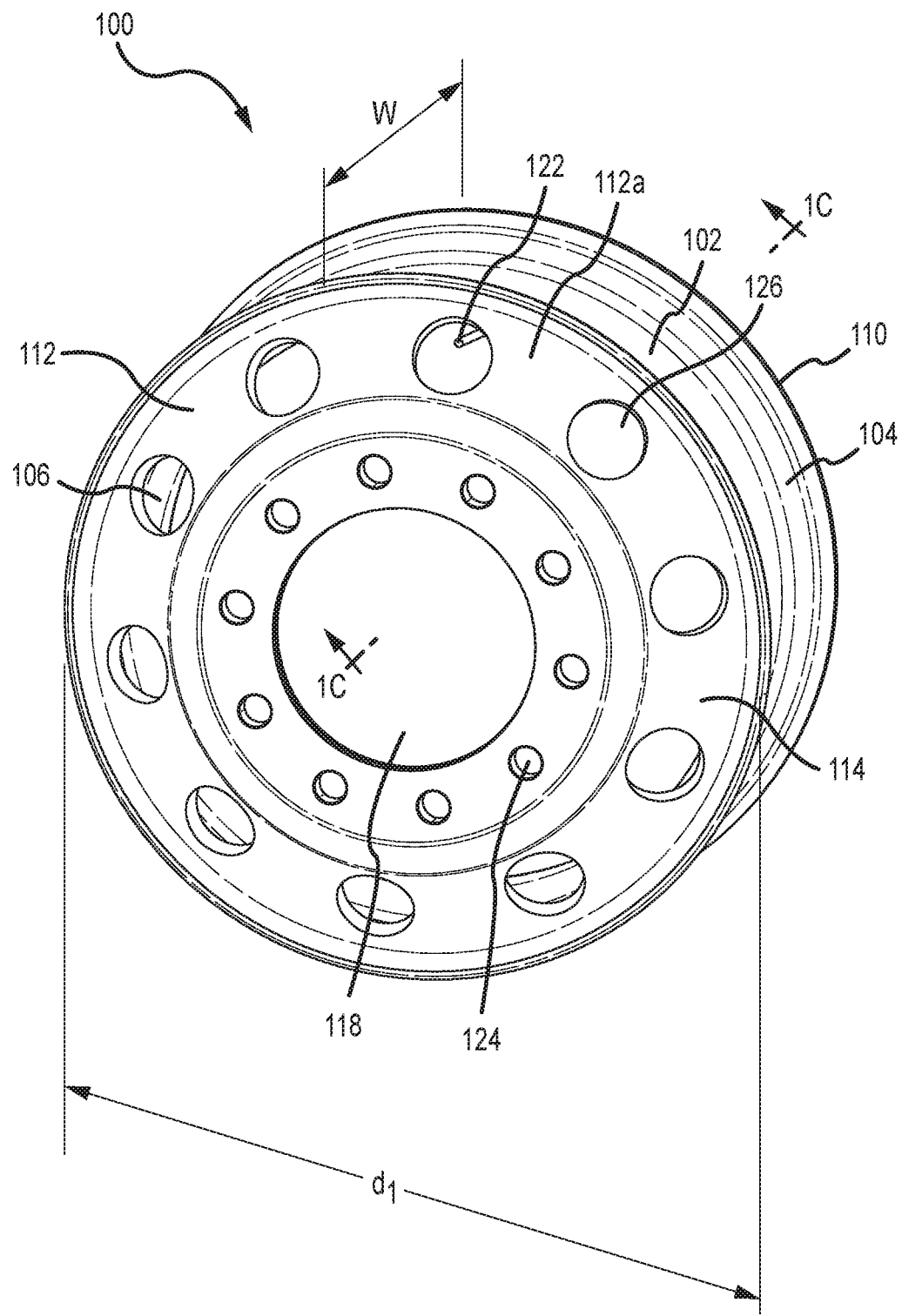
FIG. 1A is a front perspective view of a non-limiting embodiment of a vehicle wheel comprising a flange extension according to the present disclosure.
Figure 1B:
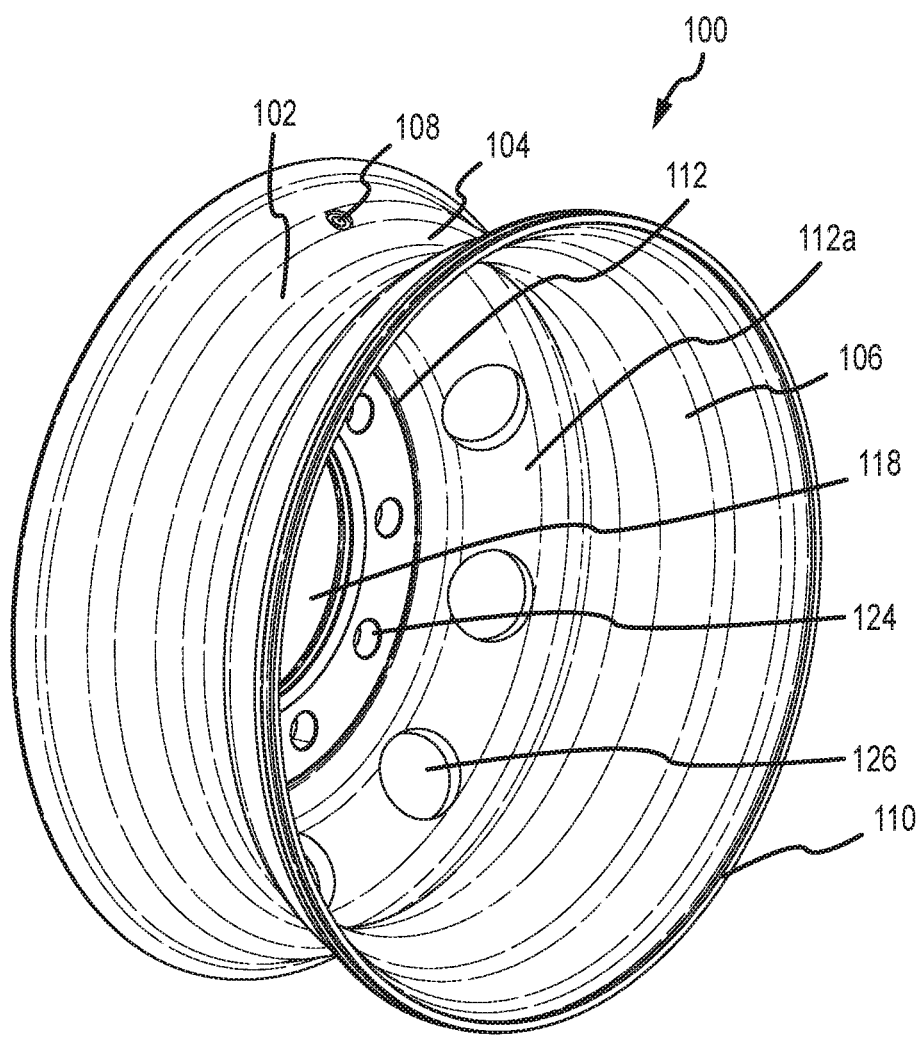
FIG. 1B is a back perspective view of the vehicle wheel of FIG. 1A.
Figure 1C:
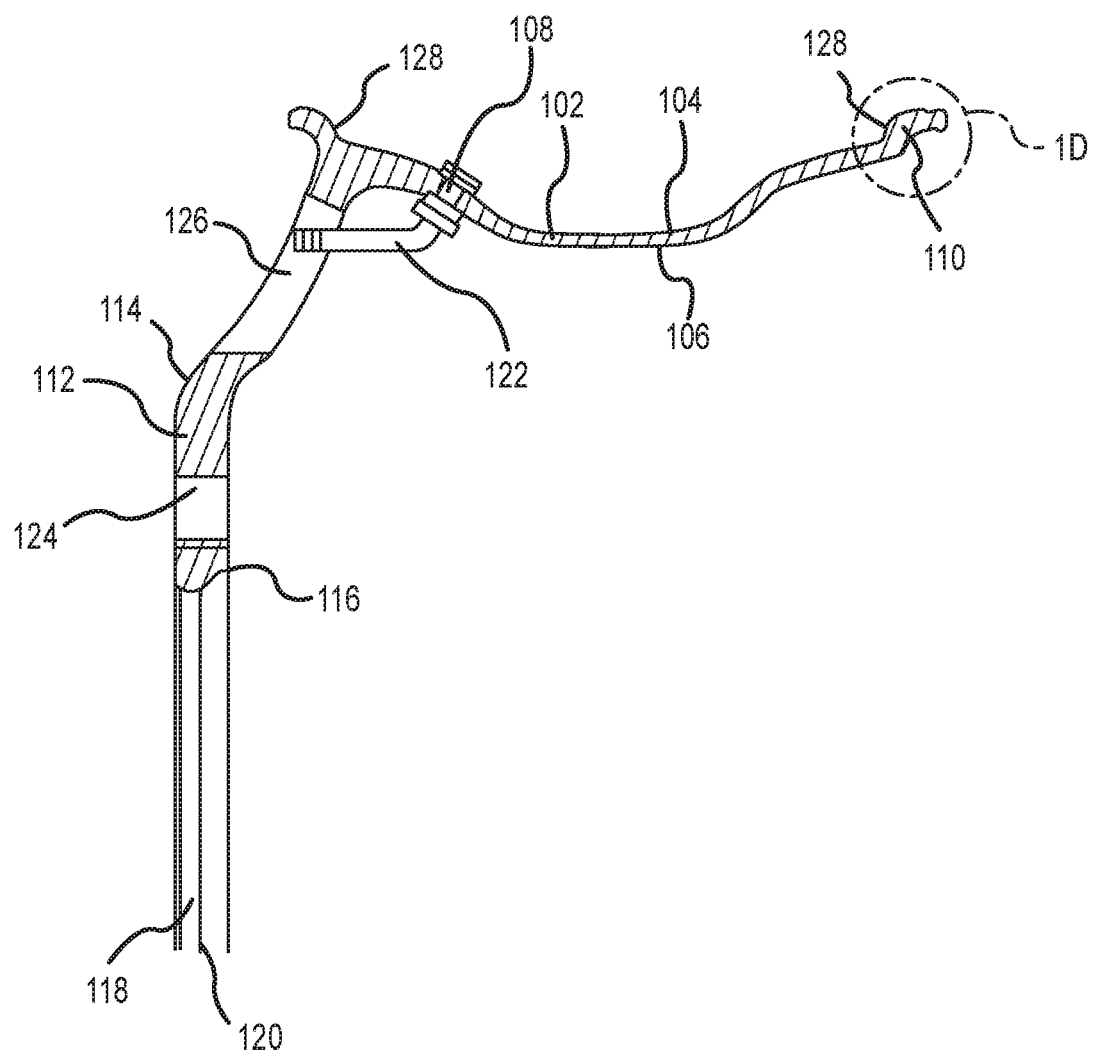
FIG. 1C is a cross-sectional view of the vehicle wheel of FIG. 1A taken along line 1C-1C in FIG. 1A.

Various embodiments are described and illustrated herein to provide an overall understanding of the structure, function, and use of the disclosed articles and methods. The various embodiments described and illustrated herein are non-limiting and non-exhaustive. Thus, an invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be immediately adjacent to or in contact with the first and/or second elements, and other elements may be disposed between the referenced element and the first and/or second elements.

The present inventors observed that reducing the thickness of a vehicle wheel can reduce the rigidity of the vehicle wheel. Additionally, the present inventors discovered that securely attaching components to a vehicle wheel presents challenges. Thus, vehicle wheel features and methods of making a vehicle wheel are provided herein that can increase rigidity of the vehicle wheel and/or enable secure attachment of components to the vehicle wheel.

FIGS. 1A-1D illustrate a non-limiting embodiment of a vehicle wheel according to the present disclosure. The vehicle wheel 100 comprises a first region 102, a second region 112, and a flange extension 110. In various non-limiting embodiments, the vehicle wheel 100 can comprise a first region 102 (e.g., rim section) with a reduced thickness to lower the weight of the vehicle wheel 100.

The first region 102 can be generally annular and can comprise an outer surface 104 and an inner surface 106. The outer surface 104 can comprise a tire bead seat 128, which can be disposed about a circumference of the outer surface 104 of the first region 102. The tire bead seat 128 can be configured so that a tire (e.g., tire 260 in FIG. 2) can be mounted thereon and form a generally airtight seal therewith. The tire can comprise any suitable dimensions for mounting on the tire bead seat 128. For example, depending on the dimensions of the tire bead seat 128, the tire can comprise dimensions of 11R22.5, 295/75R22.5, 11R24.5, 285/75R24.5, or other suitable dimensions.

The first region 102 can comprise a nominal rim width and a nominal rim diameter adapted to receive a tire. In various non-limiting embodiments, the first region 102 can comprise a nominal rim width, w, in a range of 1 inch (2.54 mm) to 100 inches (2540 mm), such as, for example, 6 inches (152.4 mm) to 24 inches (609.6 mm), 6 inches (152.4 mm) to 12 inches (304.8 mm), or 5.5 inches (139.7 mm) to 17 inches (431.8 mm). For example, and without limitation, in certain non-limiting embodiments, the nominal rim width, w, of the first region 102 can be 8.25 inches (209.6 mm) or 11 inches (279.4 mm).

In various non-limiting embodiments, the first region 102 can comprise a nominal rim diameter, $d_1$, in a range of 1 inch (2.54 mm) to 200 inches (5080 mm), such as, for example, 14 inches (406.4 mm) to 25 inches (635 mm), 19 inches (482.6 mm) to 25 inches (635 mm), or 16 inches (406.4 mm) to 24 inches (609.6 mm). For example, and without limitation, in certain non-limiting embodiments, the nominal rim diameter, $d_1$, of the first region 102 can be 22.5 inches (571.5 mm) or 24.5 inches (622.3 mm).

In various non-limiting embodiments, the first region 102 can comprise a valve stem mount 108. The valve stem mount 108 can be configured to receive a valve stem 122 in order to control gas transport into and out of a tire mounted on the vehicle wheel 100.

The second region 112 can extend radially inwardly from the first region 102. In certain non-limiting embodiments, the second region 112 is integral with and extends radially inwardly from the inner surface 106 of the first region 102. In various non-limiting embodiments, the second region 112 extends in a direction that is substantially perpendicular to the inner surface 106 of the first region 102. The second region 112 can comprise a first surface 114, a second surface 116, and an opening 118 extending from the first surface 114 to the second surface 116.

The second region 112 can be configured to mount to a vehicle axle (not shown). For example, the opening 118 can be configured to receive at least a portion of a hub of the vehicle axle. Additionally, a hub surface 120 of the second region 112 can be configured to engage the hub of the vehicle axle and facilitate alignment of the vehicle wheel 100 with the hub of the vehicle axle. In various non-limiting embodiments, the hub surface 120 can comprise a pilot bore suitable to engage a pilot tab of the hub of the vehicle axle.

In various non-limiting embodiments, the second region 112 can comprise at least two bores 124 extending from the first surface 114 to the second surface 116. Each of the at least two bores 124 can be configured to receive a stud on a hub of a vehicle axle. Center points of each of bores 124 can be disposed evenly about a mounting circle. In various non-limiting embodiments, the mounting circle has a center point common with a center point of the second region 112. In various non-limiting embodiments, the mounting circle can comprise a mounting diameter in a range of 1 inch (25.4 mm) to 15 inches (381 mm). For example, the mounting diameter can be 11.25 inches (285.75 mm). In various non-limiting embodiments, each bore 124 can have a diameter in a range of 0.1 inches (2.54 mm) to 2 inches (50.8 mm). For example, each bore 124 can have a diameter of 1.023 inches (26 mm). In various non-limiting embodiments, the second region 112 can comprise ten bores 124.

In various non-limiting embodiments, the second region 112 can comprise at least two peripheral openings 126 disposed about a periphery 112a of the second region 112 and proximal to the first region 102. The at least two peripheral openings 126 can reduce a weight of the vehicle wheel 100. In various non-limiting embodiments, the second region 112 can comprise ten peripheral openings 126. In various non-limiting embodiments, the peripheral openings 126 can be disposed about the second region 112 offset from the bores 124, as illustrated in FIG. 1A, or can be disposed about the second region 112 substantially in line with the bores 124 (not shown). An offset disposition of the bores 124 and the peripheral openings 126, such as is shown in FIG. 1A, can increase a load rating of the vehicle wheel 100. In various non-limiting embodiments, each peripheral opening 126 can be disposed evenly about a peripheral circle. In various non-limiting embodiments, the peripheral circle has a center point common with a center point of the second region 112. The peripheral circle, for example, can comprise a peripheral diameter in a range of 2 inches (50.8 mm) to 22 inches (558.8 mm). For example, the peripheral diameter can be 17.3 inches (439.42 mm).

Figure 1D:
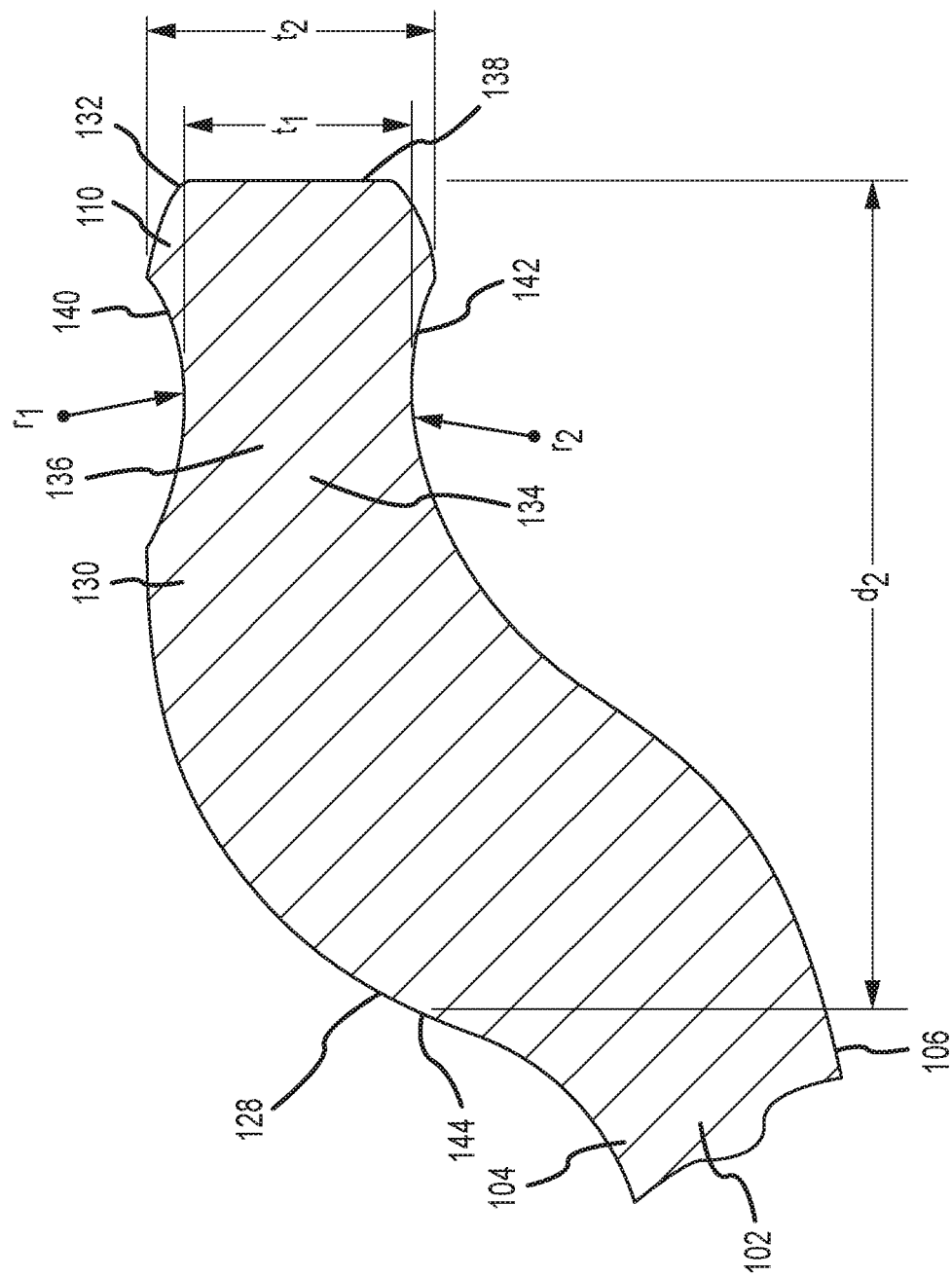
FIG. 1D is a detailed cross-sectional view of region 1D of the vehicle wheel of FIG. 1C.

Referring to FIG. 1D, the flange extension 110 can extend axially from the first region 102. The flange extension 110 can comprise a first extension end 130 integral with the first region 102, a second extension end 132, and an elongate portion 134 intermediate the first extension end 130 and the second extension end 132. For example, the flange extension 110 can be a feature of the vehicle wheel 100 that extends axially beyond a standard wheel flange limit. The flange extension 110 can provide additional rigidity to (e.g., increase stiffness of) the vehicle wheel 100 and/or be adapted for attachment of components. In various non-limiting embodiments, the vehicle wheel 100 can have two flange extensions extending from both ends of the first region 102.

Figure 2:
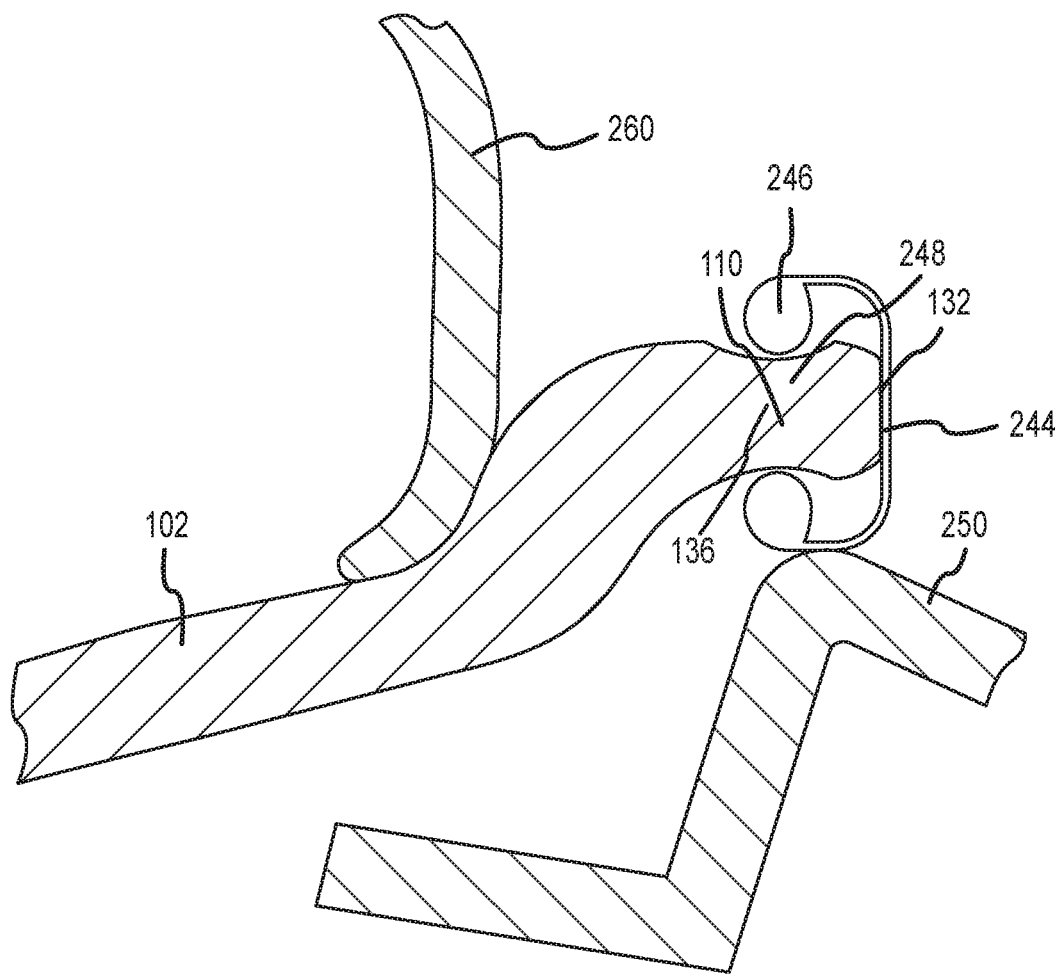
FIG. 2 is a cross-sectional view of a region of a non-limiting embodiment of a vehicle wheel comprising a mounting clip and a component according to the present disclosure.

In various non-limiting embodiments, the flange extension 110 can be configured with a geometry (e.g., shape and size) that increases stiffness of the vehicle wheel 100. For example, the flange extension 110 can comprise a geometry similar to an I-beam. For example, the elongate portion 134 of the flange extension 110 can comprises a first portion 136 with a first thickness, $t_1$, less than a second thickness, $t_2$, of the second extension end 132. The reduced thickness of the first portion 136 can enable the flange extension 110 to act similar to an I-beam such that it can provide rigidity to the vehicle wheel 100 in both bending and shear load relative to the plane of the flange extension 110. Additionally, the reduced thickness of the first portion 136 can enable a mounting clip, such as, for example, mounting clip 244 as illustrated in FIG. 2, or other device or component to be secured to the vehicle wheel 100.

Referring again to FIG. 1D, in various non-limiting embodiments, the second extension end 132 can comprise a surface 138 extending away from the first region 102. In various non-limiting embodiments, the surface 138 can be substantially flat as illustrated in FIG. 1D, curved (not illustrated), or recessed as illustrated at 456 in FIG. 4B herein. The second extension end 132 can be configured to receive a mounting clip. For example, the second extension end 132 can comprise a taper extending from the elongate portion 134 to the surface 138. Thus, the second extension end 132 can facilitate opening of a resilient mounting clip as the mounting clip passes over the second extension end 132, and the reduced thickness of the first portion 136 then allows the mounting clip to retract, thereby securing the mounting clip to the flange extension 110 and the vehicle wheel 100.

The first portion 136 can comprise a first curved surface 140 extending from the outer surface 104 of the first region 102 and a second curved surface 142 extending from the inner surface 106 of the first region 102. The first and second curved surfaces 140 and 142 can be concave. The first and second curved surfaces 140 and 142 can enable a reduced mass of the flange extension portion while enabling the flange extension portion to provide rigidity to the vehicle wheel 100 and, for example, receive mounting clips.

The first curved surface 140 can transition into the outer surface 104 of the first region 102 at an inflection point 144, and the second curved surface 142 can transition into the inner surface 106 of the first region 102 along a substantially constant radius of curvature $r_2$. The first curved surface 140 can comprise a radius of curvature, $r_1$, and the second curved surface 142 can comprise a radius of curvature, $r_2$. Each radius of curvature $r_1$ and $r_2$ can be in a range of, for example, 0.1 inch (2.54 mm) to 1 inch (25.4 mm), such as, for example, 0.1 inch (2.54 mm) to 0.5 inch (12.7 mm), 0.15 inch (3.81 mm) to 0.4 inch (10.16 mm), 0.2 inch (5.08 mm) to 0.4 inch (10.16 mm), or 0.25 inch (6.35 mm) to 0.35 inch (8.89 mm). The radii of curvature $r_1$ and $r_2$ can be the same or can be different. For example, the radius of curvature, $r_2$, can be greater than the radius of curvature, $r_1$.

The flange extension 110 can extend a distance, $d_2$, from the tire bead seat 128 such that the flange extension 110 can receive a mounting clip with minimal, if any, interference from a tire mounted on the vehicle wheel 100. Additionally, the distance, $d_2$, may be selected such that the flange extension 110 does not contact or otherwise interfere with any region of a vehicle when mounted on an axle of the vehicle. For example, the flange extension 110 can extend a distance, $d_2$, from the tire bead seat 128 that is at least 0.5 inches (12.7 mm), such as, for example, at least 0.6 inches (15.24 mm), at least 0.7 inches (17.78 mm), at least 0.8 inches (20.32 mm), at least 0.9 inches (22.86 mm), or at least 1 inch (25.4 mm). The flange extension 110 can extend a distance, $d_2$, from the tire bead seat 128 that is no greater than 2 inches (50.8 mm), such as, for example, no greater than 1.5 inches (38.1), no greater than 1 inch (25.4 mm), no greater than 0.9 inches (22.86 mm), no greater than 0.8 inches (20.32 mm), or no greater than 0.7 inches (17.78 mm). In various non-limiting embodiments, the flange extension 110 can extend a distance, $d_2$, from the tire bead seat 128 that is in a range of 0.5 inches (12.7 mm) to 2 inches (50.8 mm), such as, for example, 0.6 inches (15.24 mm) to 1.5 inches (38.1) or 0.8 inches (20.32 mm) to 1 inch (25.4 mm).

In various non-limiting embodiments, the flange extension 110 can have a variable thickness along its axial length. For example, the first portion 136 of the elongate portion 134 can have a thickness, $t_1$, and the second extension end 132 can have a thickness, $t_2$. The variable thickness can be adjusted to reduce weight of the flange extension 110 and/or optimize the attachment of a mounting clip to the flange extension 110. For example, the thickness, $t_2$, can be in a range of 0.2 inches (5.08 mm) to 1 inch (25.4 mm), such as, for example, 0.25 inches (6.35 mm) to 1 inch (25.4 mm), 0.2 inches (5.08 mm) to 0.5 inches (12.7 mm), 0.2 inches (5.08 mm) to 0.4 inches (10.16 mm), or 0.25 inches (6.35 mm) to 0.35 inches (8.89 mm). In various non-limiting embodiments, the thickness, $t_1$, can be at least 0.01 inches (0.254 mm) less than the thickness, $t_2$, such as, for example, at least 0.05 inches (1.27 mm) less, at least 0.1 inches (2.54 mm) less, at least 0.15 inches (3.81 mm) less, at least 0.2 inches (5.08 mm) less, or at least 0.25 inches (6.35 mm) less than the thickness, $t_2$.

The flange extension 110 and can be used to efficiently and securely fasten external components to the vehicle wheel 100. For example, the flange extension 110 can include a feature to which components such as, for example, mounting clip 244 and/or a component 250 can operatively couple. In various non-limiting embodiments, referring to FIG. 2, the vehicle wheel 100 can comprise a component including mounting clip 244, wherein mounting clip 244 is configured to engage the first portion 136 and be retained by the second extension end 132. For example, the mounting clip 244 can comprise a clip, a clamp, a fastener, a snap-ring, or a combination thereof. In various non-limiting embodiments, the mounting clip 244 can be resilient such that the mounting clip 244 has an opening 248 that can increase in a dimension to receive the second extension end 132 and enable a first end 246 of the mounting clip 244 to pass over the second extension end 132 to the first portion 136 of the elongate portion 134. Thereafter, the opening 248 can decrease in the dimension such that the mounting clip 244 is retained by the second extension end 132 and is secured to the flange extension 110.

Figure 3:
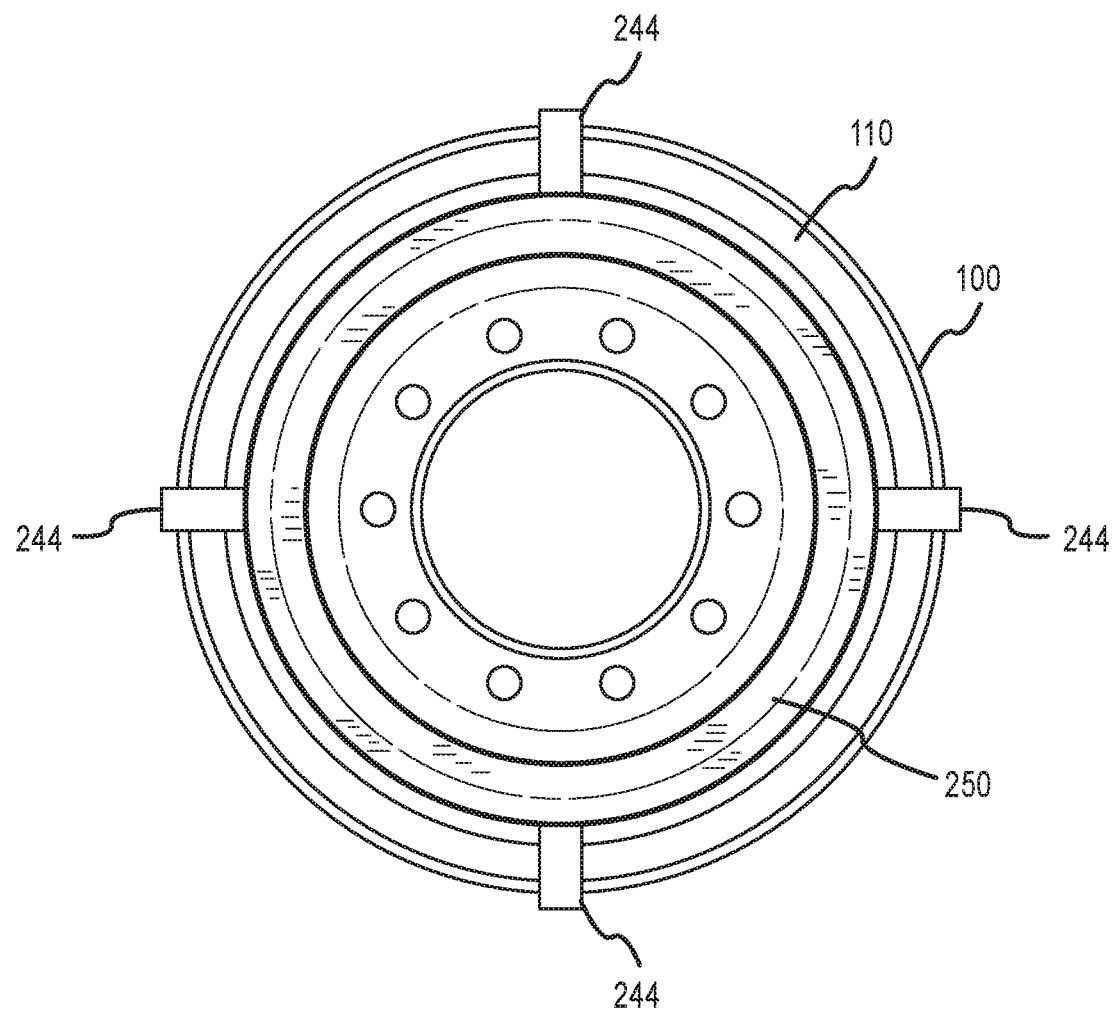
FIG. 3 is a schematic side view of a vehicle wheel comprising at least two mounting clips and a component according to the present disclosure.

The mounting clip 244 can be configured to retain the component 250 proximal to the flange extension 110. For example, the component can be placed proximal to the flange extension 110, and the mounting clip 244 can engage the first portion 136 and the component 250 to retain the component 250 in the position proximal to the flange extension 110. The component 250 can comprise one or more of, for example, a wheel cover (e.g., aero cover), a beauty ring, an energy harvesting system, a lighting system, and a wheel-balancing system. The component 250 can be operatively coupled to the vehicle wheel by a single mounting clip 244, as illustrated in FIG. 2, or two or more mounting clips 244, as illustrated in FIG. 3. As illustrated in FIG. 3, the vehicle wheel 100 can comprise two or more mounting clips 244 configured to engage the first portion 136 and retain the component 250.

The mounting clip 244 and component 250 can be separate pieces or a single, continuous piece. In embodiments where the mounting clip 244 and component are separate pieces, the mounting clip 244 can press the component 250 against the vehicle wheel 100 and/or hold the component 250 in a desired position and/or orientation.

Figure 4A:
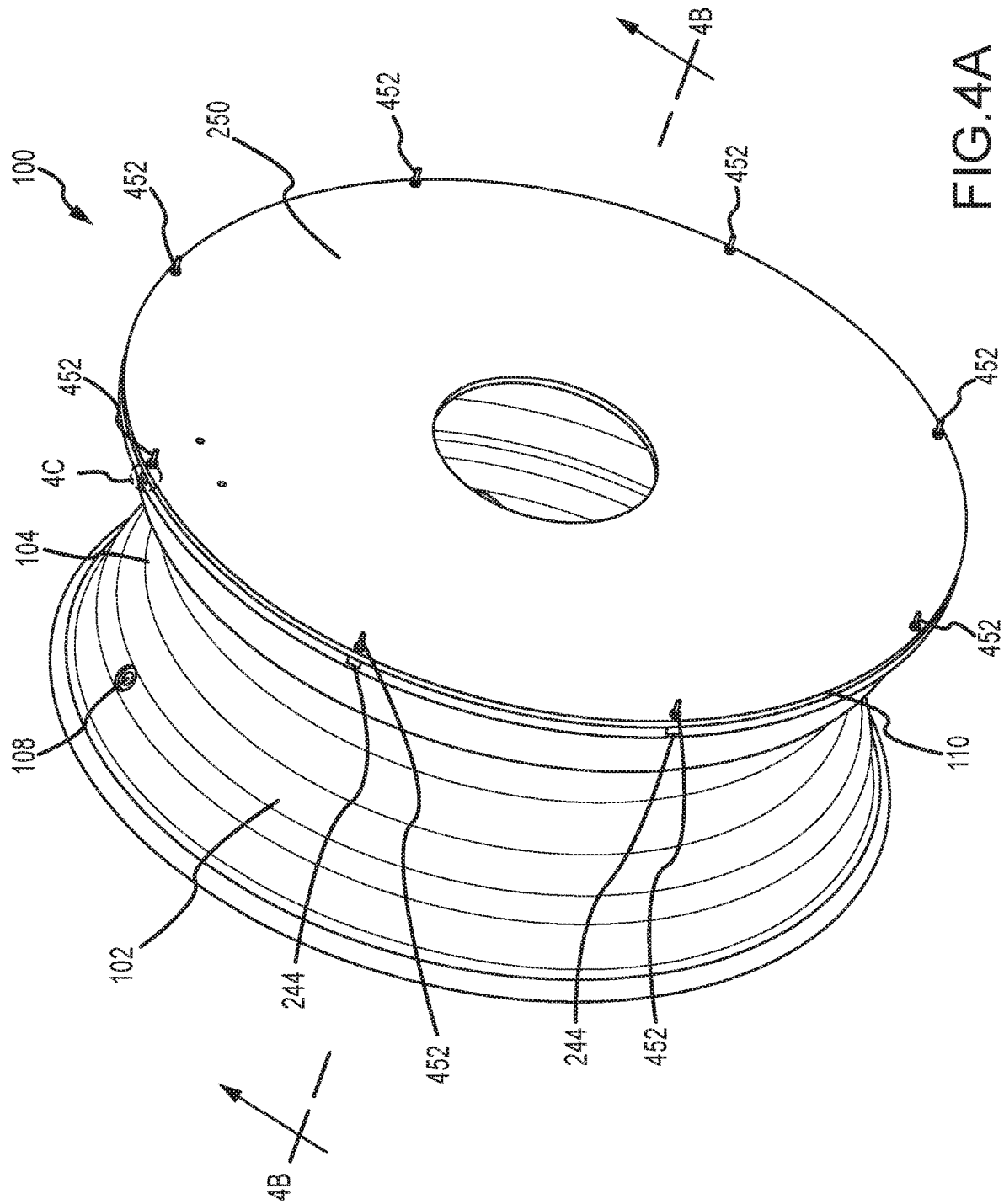
FIG. 4A is a back perspective view of a non-limiting embodiment of a vehicle wheel and a component secured to the vehicle wheel by mounting clips according to the present disclosure.
Figure 4B:
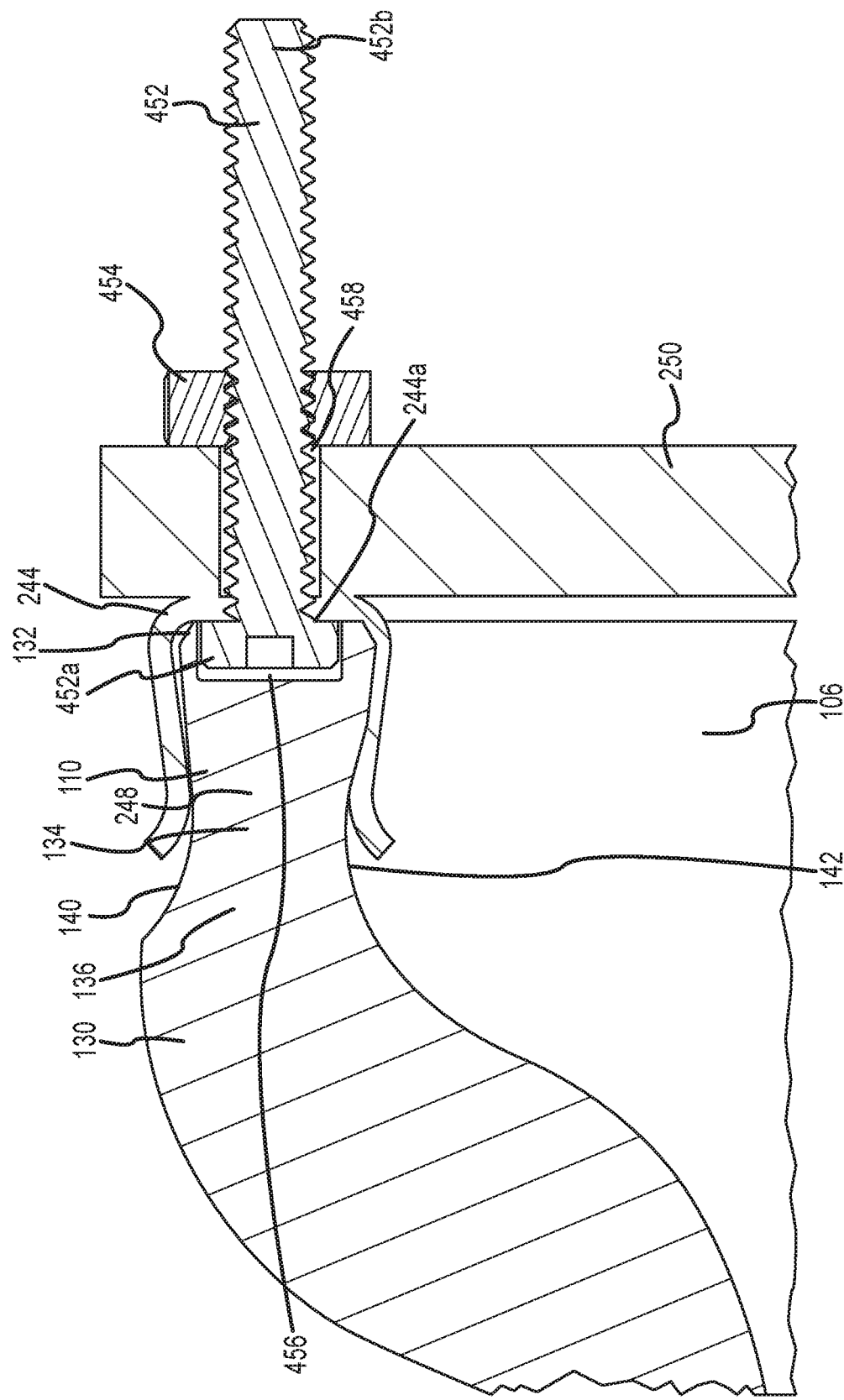
FIG. 4B is a cross-sectional view of the vehicle wheel of FIG. 4A taken along line 4B-4B in FIG. 4A.
Figure 4C:
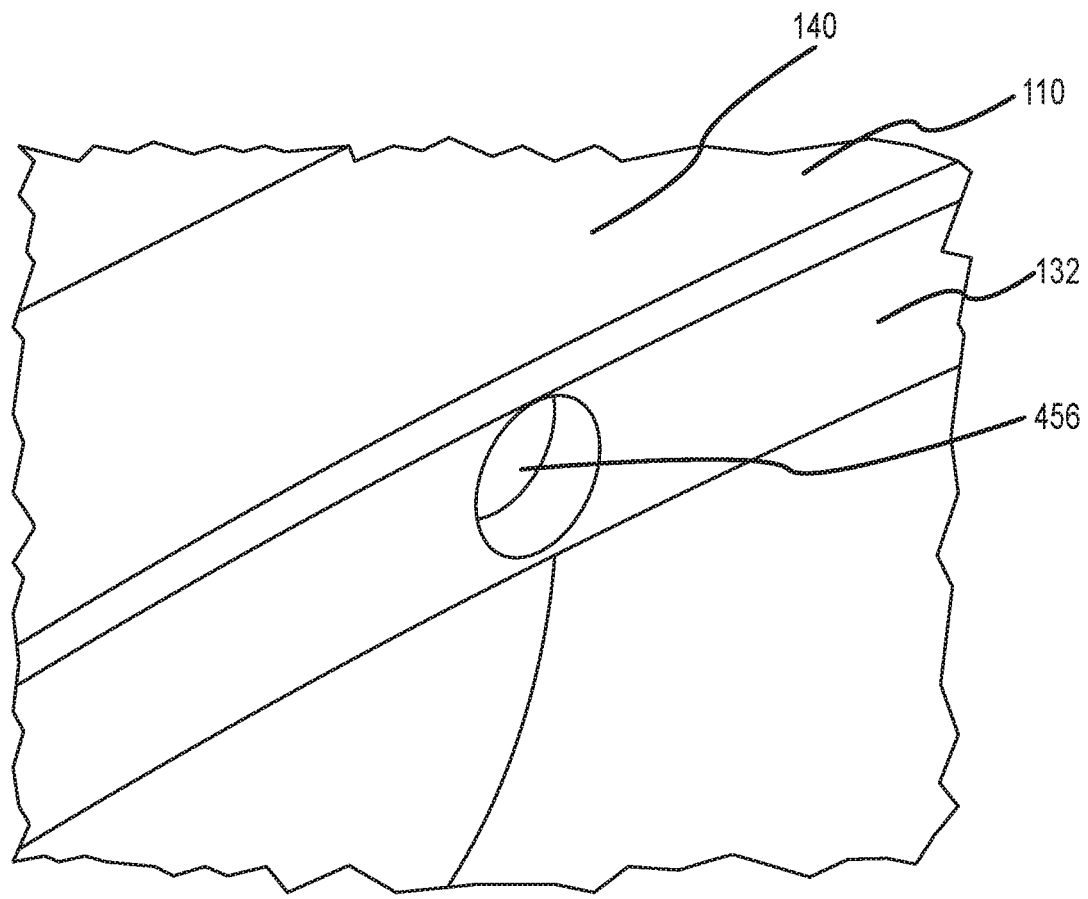
FIG. 4C is a detailed view of region 4C of the vehicle wheel of FIG. 4A with the component, mounting clips, fastener, and collar hidden.

Referring to FIGS. 4A-4C, a fastener 452 can be operatively coupled to each mounting clip 244. For example, as illustrated in FIG. 4B, each mounting clip 244 can comprise a bore 244a through which the fasteners 452 can extend. The fasteners 452 can comprise a head portion 452a and a pin 452b. The head portion 452a can be configured to inhibit the pin 452b from traversing completely through the bore 244a. The pin 452b can comprise threads suitable to engage threads of a collar 454. The pin 452b can be inserted at least partially into the opening 248 of the mounting clip 244 and then at least partially into the bore 244a prior to installation of the mounting clip 244 on the flange extension 110 such that the head portion 452 is at least partially disposed within the opening 248 of the mounting clip 244.

After inserting the pin 452b of the fastener 452 at least partially into the bore 244a, the mounting clip 244 can be secured to the flange extension 110. In various non-limiting embodiments, the flange extension 110 can comprise recesses 456 suitable to receive the head portion 452a of a respective fastener 452. The recesses 456 can inhibit the head portion 452a of each fastener 452 from moving circumferentially along the flange extension 110 after securing the mounting clip 244 to the flange extension 110. In various non-limiting embodiments, the flange extension 110 can comprise a recessed channel (not shown) configured to receive the head portion 452a of the fasteners 452 such that the mounting clips 244 can be slid circumferentially along the flange extension 110 after securing the mounting clip 244 to the flange extension 110.

The component 250 can comprise bores 458 configured to receive the pin 452b of each fastener 452. The bores 458 can be radially spaced along the periphery of the component 250. The pin 452b of a respective fastener 452 can be inserted at least partially into the bore 458 and the collar 454 can be threaded onto to the pin 452b such that the component 250 is intermediate the head portion 452a and the collar 454.

Thereafter, the collar 454 can be tightened onto the pin 452b to at least partially secure the component 250 to the mounting clip 244. Thus, if the mounting clip 244 is secured to the flange extension 110, the component 250 is also secured to the flange extension 110 by the fastener 452 and collar 454. In various non-limiting embodiments, at least two sets of components can be used to secure the component 250 to the flange extension 110, wherein each set of components comprises a mounting clip 244, a fastener 452, and a collar 454. For example, as illustrated in FIG. 4A, eight sets of components can be used to secure the component 250 to the flange extension 110.

In various embodiments, the vehicle wheels according to the present disclosure can comprise a metal, a metal alloy, a composite material, or a combination thereof. For example, the vehicle wheel according to the present disclosure can comprise at least one of aluminum, an aluminum alloy, titanium, a titanium alloy, magnesium, a magnesium alloy, iron, an iron alloy, and carbon fiber.

In various embodiments, vehicle wheels according to the present disclosure can be, for example, at least one of a bonded wheel, a welded wheel, a formed wheel (e.g., vacuum formed), a cured wheel, a cast wheel, a forged wheel, and an additively manufactured wheel. The vehicle wheels according to the present disclosure may have been subjected to further processing such as, for example, a lathe procedure, to provide the final vehicle wheel.

In various non-limiting embodiments, a vehicle wheel according to the present disclosure can weigh at least 10 pounds (lbs.) (4.5 kg), such as, for example, at least 25 lbs. (11.3 kg), at least 35 lbs. (15.9 kg), or at least 40 lbs. (18.1 kg). In some embodiments, a vehicle wheel according to the present disclosure can weigh no greater than 50 lbs. (22.7 kg), such as, for example, no greater than 40 lbs. (18.1 kg), no greater than 35 lbs. (15.9 kg), no greater than 25 lbs. (11.3 kg), or no greater than 10 lbs. (4.5 kg). In some embodiments, a vehicle wheel according to the present disclosure can have a weight in a range of 10 lbs. (4.5 kg) to 50 lbs. (22.7 kg), such as, for example, 25 lbs. (11.3 kg) to 40 lbs. (18.1 kg).

In various non-limiting embodiments, the load rating of a vehicle wheel according to the present disclosure can be at least 1,000 pounds (lbs.) (453.6 kg), such as, for example, at least 5,000 lbs. (2268 kg), at least 9,000 lbs. (4082.3 kg), at least 10,000 lbs. (4535.92 kg), at least 13,000 lbs. (5896.7 kg), or at least 15,000 lbs. (6803.89 kg). In various non-limiting embodiments, the load rating of a vehicle wheel according to the present disclosure can be no greater than 20,000 lbs. (9071.85 kg), such as, for example, no greater than 15,000 lbs. (6803.89 kg), no greater than 13,000 lbs. (5896.7 kg), no greater than 10,000 lbs. (4535.92 kg), no greater than 9,000 lbs. (4082.3 kg), or no greater than 5,000 lbs. (2268 kg). In various non-limiting embodiments, the load rating of a vehicle wheel according to the present disclosure can be 1,000 lbs. (453.6 kg) to 20,000 lbs. (9071.85 kg), such as, for example, 5,000 lbs. (2268 kg) to 15,000 lbs. (6803.89 kg) or 9,000 lbs. (4082.3 kg) to 13,000 lbs. (5896.7 kg). In various embodiments, the load rating of a vehicle wheel according to the present disclosure can be at least 10,000 lbs. (4535.92 kg) and the vehicle wheel can weigh less than 40 lbs. (18.1 kg).

A method for using a vehicle wheel according to the present disclosure is provided. The method comprises mounting a vehicle wheel according to the present disclosure on a steer axle of a vehicle, a drive axle of a vehicle, or a trailer axle of a trailer. The vehicle can comprise a vehicle weight class in a range of 1 to 8, such as, for example, 3 to 8, as defined by the U.S. Federal Highway Administration. For example, in various non-limiting embodiments, the gross weight of the vehicle can be at least 10,001 lbs. (4536.48 kg) or at least 26,000 lbs. (11,798.4 kg). The vehicle can be, for example, a light-duty, medium-duty, or heavy-duty vehicle, such as, for example, a medium-duty or heavy-duty vehicle. In various non-limiting embodiments, the vehicle can be a truck (e.g., pick-up, full-sized, tractor (e.g., semi-truck)), a van, or a bus. The vehicle can comprise at least two axles, such as, for example, at least three axles, at least four axles, at least five axles, or at least six axles. In various non-limiting embodiments, the vehicle can comprise no greater than ten axles, such as, for example, no greater than six axles, no greater than five axles, no greater than four axles, or no greater than three axles. In various non-limiting embodiments, the vehicle can comprise a quantity of axles in a range of two to ten.

The trailer can comprise a single axle or at least two axles, such as, for example, at least three axles, at least four axles, at least five axles, or at least six axles. In various non-limiting embodiments, the trailer can comprise no greater than ten axles, such as, for example, no greater than six axles, no greater than five axles, no greater than four axles, or no greater than three axles. In various non-limiting embodiments, the trailer can comprise one to ten axles.

A method of producing a vehicle wheel according to the present disclosure also is provided. The method comprises forming, curing, forging, machining, casting, and/or additively manufacturing at least one of a metal, a metal alloy, a composite material, or a combination thereof to provide a vehicle wheel according to the present disclosure. For example, the vehicle wheel according to the present disclosure can be manufactured by spinning (e.g., flow forming). The flange extension of the vehicle wheels can be formed utilizing a lathe. Creating the flange extension with a geometry suitable to be formed on a lathe can enable rapid manufacturing of the vehicle wheels. In various embodiments, the method of making the vehicle wheel according the present disclosure comprises steps in addition to forming, curing, casting, forging, machining, or additive manufacturing.

Various aspects of the invention include, but are not limited to, the aspects listed in the following numbered clauses.

1 A vehicle wheel comprising:
  a generally annular first region comprising an inner surface and an outer surface comprising a tire bead seat;
  a second region extending radially inwardly from the first region, the second region configured to mount to a vehicle axle; and
  a flange extension extending from the first region in a direction away from the second region, the flange extension comprising:
    a first extension end integral with the first region;
    a second extension end; and
    an elongate portion intermediate the first extension end and the second extension end, the elongate portion comprising a first portion with a thickness less than a thickness of the second extension end.

2. The vehicle wheel of clause 1, wherein the second extension end comprises a substantially flat surface extending away from the first region.

3. The vehicle wheel of any one of clauses 1-2, wherein the first portion comprises a first curved surface extending from the outer surface of the first region and a second curved surface extending from the inner surface of the first region.

4. The vehicle wheel of clause 3, wherein the first and second curved surfaces are concave.

5. The vehicle wheel of any one of clauses 3-4, wherein the second curved surface transitions into the inner surface of the first region along a substantially constant radius of curvature.

6 The vehicle wheel of any one of clauses 3-5, wherein the first curved surface transitions into the outer surface of the first region at an inflection point.

7. The vehicle wheel of any one of clauses 3-6, wherein the first curved surface and second curved surface each comprise a radius of curvature in a range of 0.1 inch to 1 inch.

8. The vehicle wheel of clause 7, wherein the radius of curvature of the second curved surface is greater than the radius of curvature of the first curved surface.

9 The vehicle wheel of any one of clauses 1-8, wherein the first region comprises a nominal rim diameter in a range of 1 inch to 200 inches and a nominal rim width in a range of 1 inch to 100 inches.

10. The vehicle wheel of any one of clauses 1-9, wherein the first region comprises a nominal rim diameter in a range of 16 inches to 24 inches and a nominal rim width in a range of 5.5 inches to 17 inches.

11. The vehicle wheel of any one of clauses 1-10, wherein the flange extension extends axially at least 0.5 inches from the tire bead seat on the first region.

12. The vehicle wheel of any one of clauses 1-11, wherein a thickness of the second extension end is in a range of 0.2 inches to 1 inch.

13. The vehicle wheel of any one of clauses 1-12, wherein the vehicle wheel comprises at least one of a metal, a metal alloy, and a composite.

14. The vehicle wheel of any one of clauses 1-13, further comprising a mounting clip configured to engage the first portion.

15. The vehicle wheel of clause 14, wherein the mounting clip comprises one or more of a clip, a clamp, a fastener, and a snap-ring.

16. The vehicle wheel of any one of clauses 14-15, further comprising a component, wherein the mounting clip is configured to retain the component proximal to the flange extension.

17. The vehicle wheel of clause 16, wherein the component comprises one or more of a wheel cover, a beauty ring, an energy harvesting system, a lighting system, and a wheel-balancing system.

18. The vehicle wheel of any one of clauses 1-17, comprising two or more mounting clips configured to engage the first portion.

19. A method of producing a vehicle wheel, the method comprising:
  providing a vehicle wheel by a method comprising at least one of forming, curing, forging, casting, and additive manufacturing, the vehicle wheel comprising one or more of a metal, a metal alloy, and a composite, the vehicle wheel comprising:
    a generally annular first region comprising an inner surface and an outer surface comprising a tire bead seat;
    a second region extending radially inwardly from the first region, the second region configured to mount to a vehicle axle; and
    a flange extension extending from the first region in a direction away from the second region, the flange extension comprising:
      a first extension end integral with the first region;
      a second extension end; and
      an elongate portion intermediate the first extension end and the second extension end, the elongate portion comprising a first portion with a thickness less than a thickness of the second extension end.

20. The method of clause 19, wherein the first region comprises a nominal rim diameter in a range of 1 inch to 200 inches and a nominal rim width in a range of 1 inch to 100 inches.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A vehicle wheel comprising:
    a generally annular first region comprising an inner surface and an outer surface comprising a tire bead seat;
    a second region extending radially inwardly from the first region, the second region configured to mount to a vehicle axle; and
    a flange extension extending from the first region in a direction away from the second region, the flange extension comprising:
        a first extension end integral with the first region;
        a second extension end; and
        an elongate portion intermediate the first extension end and the second extension end, the elongate portion comprising a first portion with a thickness less than a thickness of the second extension end;
    wherein the first portion comprises a first curved surface extending from the outer surface of the first region and a second curved surface extending from the inner surface of the first region.

2. The vehicle wheel of claim 1, wherein the second extension end comprises a substantially flat surface extending away from the first region.

3. The vehicle wheel of claim 1, wherein the first and second curved surfaces are concave.

4. The vehicle wheel of claim 1, wherein the second curved surface transitions into the inner surface of the first region along a constant radius of curvature.

5. The vehicle wheel of claim 1, wherein the first curved surface transitions into the outer surface of the first region at an inflection point.

6. The vehicle wheel of claim 1, wherein the first curved surface and second curved surface each comprise a radius of curvature in a range of 0.1 inch to 1 inch.

7. The vehicle wheel of claim 6, wherein the radius of curvature of the second curved surface is greater than the radius of curvature of the first curved surface.

8. The vehicle wheel of claim 1, wherein the first region comprises a nominal rim diameter in a range of 1 inch to 200 inches and a nominal rim width in a range of 1 inch to 100 inches.

9. The vehicle wheel of claim 1, wherein the first region comprises a nominal rim diameter in a range of 16 inches to 24 inches and a nominal rim width in a range of 5.5 inches to 17 inches.

10. The vehicle wheel of claim 1, wherein the flange extension extends axially at least 0.5 inches from the tire bead seat on the first region.

11. The vehicle wheel of claim 1, wherein a thickness of the second extension end is in a range of 0.2 inches to 1 inch.

12. The vehicle wheel of claim 1, wherein the vehicle wheel comprises at least one of a metal, a metal alloy, and a composite.

13. The vehicle wheel of claim 1, further comprising a mounting clip configured to engage the first portion.

14. The vehicle wheel of claim 13, wherein the mounting clip comprises one or more of a clip, a clamp, a fastener, and a snap-ring.

15. The vehicle wheel of claim 13, further comprising a component, wherein the mounting clip is configured to retain the component proximal to the flange extension.

16. The vehicle wheel of claim 15, wherein the component comprises one or more of a wheel cover, a beauty ring, an energy harvesting system, a lighting system, and a wheel-balancing system.

17. The vehicle wheel of claim 1, comprising two or more mounting clips configured to engage the first portion.

18. A method of producing a vehicle wheel, the method comprising:
    providing a vehicle wheel by a method comprising at least one of forming, curing, forging, casting, and additive manufacturing, the vehicle wheel comprising one or more of a metal, a metal alloy, and a composite, the vehicle wheel comprising:
        a generally annular first region comprising an inner surface and an outer surface comprising a tire bead seat;
        a second region extending radially inwardly from the first region, the second region configured to mount to a vehicle axle; and a flange extension extending from the first region in a direction away from the second region, the flange extension comprising:
a first extension end integral with the first region;
a second extension end; and
an elongate portion intermediate the first extension end and the second extension end, the elongate portion comprising a first portion with a thickness less than a thickness of the second extension end;
wherein the first portion comprises a first curved surface extending from the outer surface of the first region and a second curved surface extending from the inner surface of the first region, and
wherein the second curved surface transitions into the inner surface of the first region along a constant radius of curvature.

19. The method of claim 18, wherein the first region comprises a nominal rim diameter in a range of 1 inch to 200 inches and a nominal rim width in a range of 1 inch to 100 inches.

\* \* \* \* \*